No. 718,914. PATENTED JAN. 20, 1903.
E. COOPER.
MACHINE FOR MAKING LAMINATED SHEETS OR PLATES.
APPLICATION FILED DEC. 18, 1901.
NO MODEL. 2 SHEETS—SHEET 1.
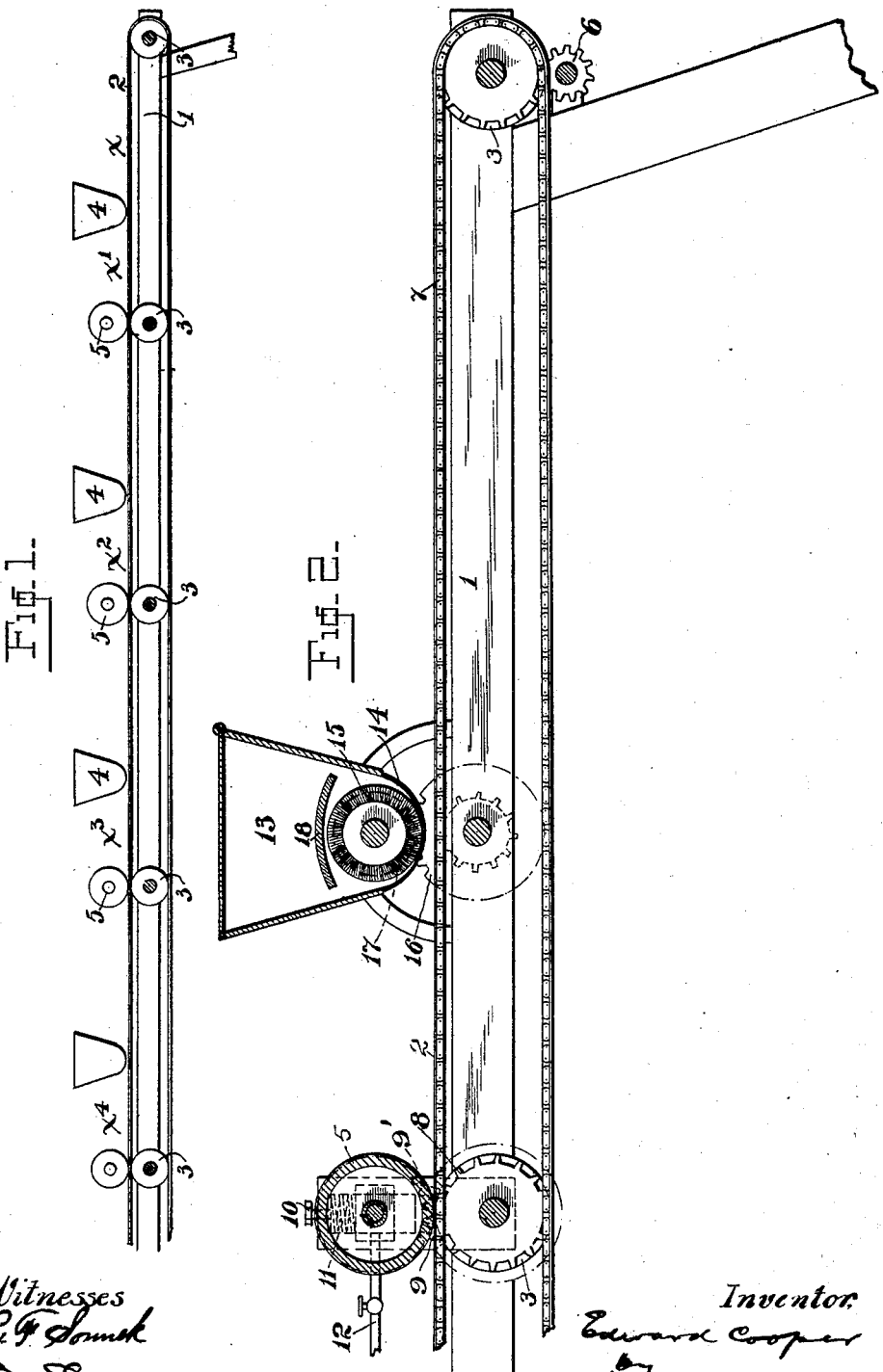

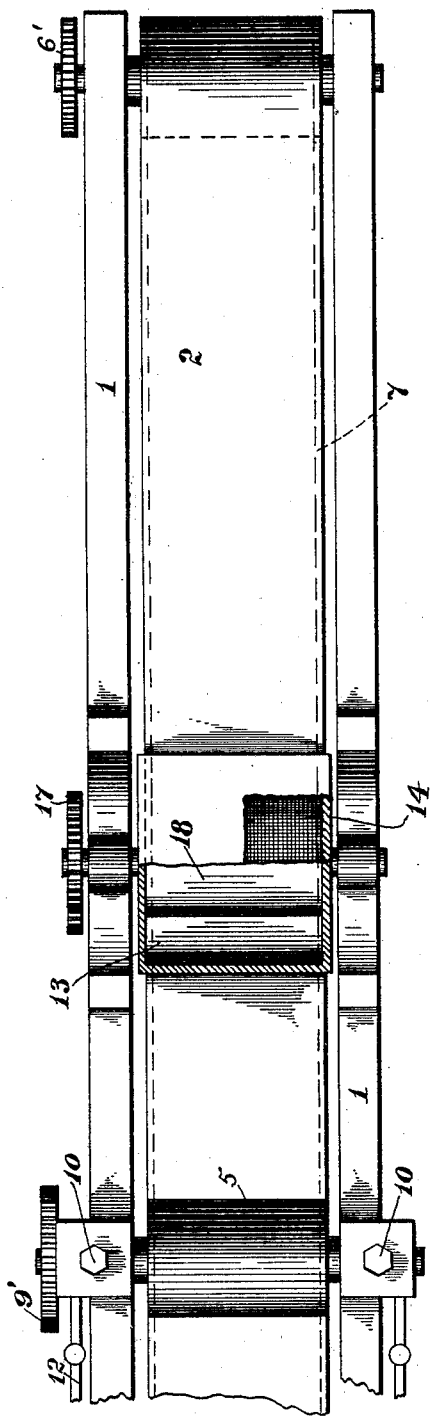

UNITED STATES PATENT OFFICE.

EDWARD COOPER, OF NEWARK, NEW JERSEY, ASSIGNOR TO SILLS-EDDY MICA COMPANY, OF NEWARK, NEW JERSEY, A CORPORATION OF VIRGINIA.

MACHINE FOR MAKING LAMINATED SHEETS OR PLATES.

SPECIFICATION forming part of Letters Patent No. 718,914, dated January 20, 1903.

Application filed December 18, 1901. Serial No. 86,349. (No model.)

*To all whom it may concern:*

Be it known that I, EDWARD COOPER, a citizen of the United States, residing at Newark, in the county of Essex and State of New Jersey, have invented certain new and useful Improvements in Machines for Making Laminated Sheets or Plates, of which the following is a specification.

This invention relates to improvements in machines for the manufacture of laminated material in the form of sheets or plates; and its object is to form such material at a less expense and of superior quality to the products now obtained.

The invention is particularly intended for the manufacture of sheets or plates from mica pieces and a cementing material, such as shellac. The usual manner of making such sheets has been to build up the sheet from pieces of mica by cementing them together with shellac varnish and then subjecting the built-up sheet to heat and pressure to expel as much of the solvent as possible. It is not, however, possible to expel all the solvent in this manner, particularly in the case of thick sheets, and the resulting product when used in locations where it is subjected to high potential and to heat is apt to give trouble, owing to softening or to breaking down of the material. It has been attempted to make up the sheets by the use of dry powdered shellac without any solvent; but such attempts have, as far as I am aware, not been practically successful either on account of the inferiority or the expensiveness of the product. I have found that the product is most satisfactorily made by building it up in a continuous manner with mica and dry powdered shellac, each piece or layer as it is placed on the preceding piece or layer being attached thereto by fused shellac or cementing material, a coating or deposit of powdered shellac being applied to the mica before or during or after the application of new pieces, and the mica pieces after they are applied being subjected to a rolling pressure by hot surfaces to melt the shellac and to force the applied mica pieces against and attach them to the underlying material. The thickness and quantity of shellac required are thereby reduced to a minimum, and in the subsequent heating under pressure the material assumes a dense solid condition, being free from any soft or solvent material.

In my application, Serial No. 86,350, filed December 18, 1901, I have disclosed a machine which is adapted to operate in this manner and have claimed same broadly irrespective of the nature of the moving support, claims being also made therein to a particular kind of support adapted to the production of curved articles.

The present invention relates to a machine which is adapted to the production of flat plates or sheets in the manner above set forth and which comprises a traveling carrier or apron on which the mica pieces or strips are laid by the operator or operators, means for applying shellac dust or powder to the mica, and heating and rolling means, as hereinafter set forth.

In the accompanying drawings, Figure 1 is a diagrammatic view of the apparatus or machine embodying my invention. Fig. 2 is a vertical longitudinal section of a portion of the machine, showing one set of shellac-supplying and pressure and heat applying devices. Fig. 3 is a plan view of the apparatus shown in Fig. 2.

Referring to Fig. 1, a traveling carrier or apron 2 is mounted to travel on suitable driving and supporting rolls 3, journaled in a frame or support 1, and at any desired number of points along this apron are arranged sets of devices adapted to attach additional layers of mica to the material which is carried by said apron, an operator or attendant being located at each such set of devices and in case of wide sheets on each side of the apron to supply the mica strips for such attachment. Each of the mica-attaching sets of devices comprises a means 4 for feeding and distributing finely-divided shellac and a heated pressure-roll 5, the shellac-feeding means distributing the finely-divided shellac, so that when the operator or attendant lays the strips or pieces of mica in overlapping arrangement to form a layer, either on the canvas apron or on sheets of paper or other material placed thereon as temporary supports, the shellac-powder will be distributed over and between said pieces, and in the further movement of the carrying-apron the pressure-roll exerts a rolling pressure on the mica pieces and at the same time heats the shellac so as to melt it, the shellac being thereby squeezed to a minimum thinness and the mica pieces firmly attached to the underlying layers. The layer set on by each attendant or pair of attendants is thus superimposed on the previously-attached layers until the product has been built up to the desired thickness, when it is removed from the apron and, if desired, is baked under pressure to harden and stiffen it.

The construction of the machine is shown more in detail in Figs. 2 and 3. One of the rolls 3 is connected to suitable driving means, as gearing 6 6', which drives the apron at a slow speed, so as to allow time for the attendants to lay the mica in place. The other rolls are driven by a chain 7, engaging on sprocket-wheels 8 on all the rolls. Gears 9 on said rolls engage with gear 9' on the shafts of pressure-rolls 5 to drive said pressure-rolls at a circumferential speed equal to the speed of the apron 2. Adjustable pressure-applying means, such as a screw 10 and spring 11, are applied to the journal-boxes 11 of rolls 5 to give a yielding adjustable pressure. Means are provided for heating said rolls—for example, a steam-pipe connection 12, whereby steam may be passed into the rolls, though any other suitable means may be used. 13 indicates a shellac-dust box or receiver for finely-divided fusible cementing material, mounted, preferably, so that the place at which the attendants place the mica on the apron is between the said box and the pressure-roll, this box being in the form of a trough or hopper with a sieve or perforated bottom 14, a rotating brush 15 being journaled in the box and being driven from the chain 7 by gearing 16 17, so as to cause the shellac to pass through the sieve in a continuous and distributed manner. A plate 18 is placed over the brush 15 to prevent clogging.

The operation of the machine is as follows: Operators are stationed along the apron at the points marked $x$ $x'$ $x^2$, &c., and the operator at $x$ first places a layer of mica pieces in overlapping order either on the apron or on an iron, paper, or cloth blank placed thereon. The movement of the apron then carries this layer of mica under the shellac-dust box, which distributes a layer of finely-divided shellac on same. The second operator or pair of operators then lays a second layer of mica pieces on the first layer, and the apron then carries the material under the heated pressure-roll, which causes the shellac to melt and presses the layers closely together to form a compact mass. Successive layers are thus applied by the succeeding operators until the proper thickness is reached, and the sheet or plate is then, if necessary, subjected to further baking and pressing treatment in suitable hot presses.

Having thus described my invention, the following is what I claim as new therein and desire to secure by Letters Patent:

1. A machine for making built-up sheets in successive layers, comprising a traveling support, a plurality of means for feeding and distributing cementing material upon said support, intervals between successive feeding and distributing means of a character to permit manual feeding of the sheet material upon said support, and means to apply heat and pressure to the material on the support.

2. A machine for making built-up sheets in successive layers, comprising an endless traveling apron, a plurality of means to feed and distribute cementing material over said apron, and means to apply heat and pressure to the material on the apron adjacent each of said feeding and distributing means, said feeding and distributing means placed at intervals apart, said intervals of a character to permit manual feeding of the sheet material upon said support.

3. A machine for making built-up sheets in successive layers, comprising a traveling support, a plurality of means to feed and distribute cementing material upon said support, a heated pressure-roll adjacent each of said feeding and distributing means, intervals between successive feeding and distributing means, said intervals of a character to permit manual feeding of the sheet material upon said support.

4. A machine for making built-up sheets of successive layers, comprising a traveling support, a plurality of receptacles for finely-divided fusible cementing material, means in each of said receptacles for positively and evenly distributing the material therein over the traveling support, means adjacent each receptacle to apply heat and pressure simultaneously to the material on the support, and intervals between successive receptacles of a character to permit manual feeding of the sheet material upon said support.

5. A machine for making built-up sheets in successive layers, comprising a traveling support, a plurality of receptacles arranged along said support, each receptacle provided with means to feed positively and evenly cementing material upon said support, and also with means to prevent the feed from clogging, pressure-rolls arranged one above and one below the traveling support adjacent each receptacle, with heating means for one of said pressure-rolls, intervals between successive receptacles of a character to permit manual feeding of the sheet material upon said support.

6. A machine for making built-up sheets in successive layers, comprising a traveling support, a succession of receptacles for finely-divided fusible cementing material to discharge upon the support at intervals along the same, each of said receptacles being provided with means to feed positively and evenly the cementing material upon the support, the interval preceding each of said receptacles in the direction of travel of the support being of a character to permit the manual feeding of the material upon the support which constitutes the body of the sheet, and each of said receptacles succeeded by heated pressure means.

EDWARD COOPER.

Witnesses:
  A. P. KNIGHT,
  HARRY E. KNIGHT.